P. H. Niles,
Tool Handle.

N° 8,315.      Patented Aug 26, 1851.

UNITED STATES PATENT OFFICE.

PETER H. NILES, OF BOSTON, MASSACHUSETTS.

ADJUSTABLE TOOL-HAFT.

Specification of Letters Patent No. 8,315, dated August 26, 1851.

*To all whom it may concern:*

Be it known that I, PETER H. NILES, of Boston, in the county of Suffolk and State of Massachusetts, have invented a new and useful Improvement in Tool and Awl-Hafts; and I do hereby declare that the following is a full, clear, and exact description of the same, reference being had to the annexed drawings, making a part of this specification, in which—

Figure 2:
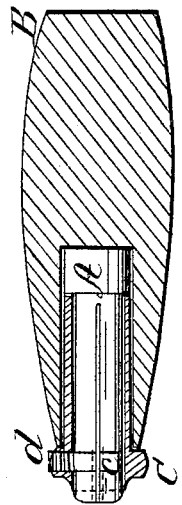
Figure 3:
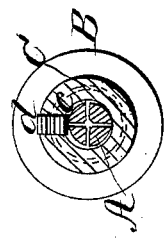
Figure 1:
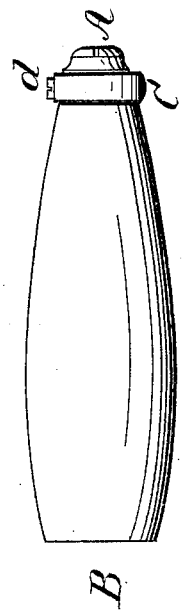

Figure 1 is a longitudinal elevation, Fig. 2 a longitudinal section, and Fig. 3 a transverse section.

In the several views the same letters refer to the same parts.

The nature of my invention consists in the mode of closing the jaws of the grip.

To enable others skilled in the art to make and use my invention, I will proceed to describe its construction and operation; I construct the grip A, in the usual manner, viz: with a recess in the outward end, for the reception of the awl, and also with longitudinal slits passing through the recess to allow of the necessary compression as shown in Figs. 2 and 3. The end of the grip, within the handle B, is enlarged to the external diameter of the tube C which surrounds the grip, and is firmly cemented, or otherwise securely fastened, to the handle B; the enlargement being for the purpose of presenting as large a surface as possible to prevent the splitting of the handle by a blow. The closing of the jaws of the grip A, is effected by means of an eccentric groove c, formed around the grip at right angles to the axis thereof, as shown in Figs. 2 and 3, and a pin d or other projection extending from the cylindrical tube C, into this cavity. Now it is evident, that, by revolving the tube, the pin d, following the eccentric groove c, will close the jaws of the grip, and retain whatever is placed between them; and to release the grip simply reverse the movement and the jaws will recede.

I do not confine myself to the formation of the eccentric on the grip, for the effect will be the same if the groove be made on the inside of the revolving tube C, and the pin d, be fastened to the grip A.

I do not claim the grip as any novelty; but

What I do claim as my invention and desire to secure by Letters Patent, is—

The mechanism by which its jaws are closed, the same consisting of the eccentric groove, the pin, and the revolving tube, as described in the above specification and shown in the accompanying drawings.

PETER H. NILES.

Witnesses:
WILLIAM A. HOLLAND.
WM. BATES.